United States Patent [19]

Brydon et al.

[11] 4,091,159

[45] May 23, 1978

[54] BONDED STRUCTURES

[75] Inventors: Donald Lithgow Brydon; Jiri George Tomka, both of Harrogate, England

[73] Assignee: Imperial Chemical Industries Limited, London, England

[21] Appl. No.: 728,995

[22] Filed: Oct. 4, 1976

[30] Foreign Application Priority Data

Oct. 13, 1975 United Kingdom ............... 41839/75

[51] Int. Cl.² ...................... B32B 27/02; B32B 31/26
[52] U.S. Cl. ..................................... 428/236; 156/306; 156/308; 428/252; 428/296; 428/394
[58] Field of Search ....................... 156/306, 308, 299; 428/411, 224, 236, 252, 253, 255, 296, 394

[56] References Cited

U.S. PATENT DOCUMENTS

| | | | |
|---|---|---|---|
| 2,417,453 | 3/1947 | Wade | 156/306 X |
| 2,418,904 | 4/1947 | Rugeley et al. | 156/306 X |
| 2,438,685 | 3/1948 | Stevens | 156/306 X |
| 2,679,469 | 5/1954 | Bedford | 156/198 |
| 2,774,702 | 12/1956 | Smith | 156/306 X |
| 3,094,452 | 6/1963 | Riegen et al. | 156/306 X |
| 3,775,382 | 11/1973 | Brydon | 260/78 R |
| 3,886,251 | 5/1975 | Sekiguchi et al. | 264/184 |

*Primary Examiner*—Harold Ansher
*Attorney, Agent, or Firm*—Cushman, Darby & Cushman

[57] ABSTRACT

Fibres, fabrics made therefrom, or films of polyoxadiazoles, having an X-ray pattern which shows a single equatorial reflection corresponding to a spacing of 3.4A, are thermally bonded to themselves or other shaped articles by heating the contacting articles whilst under pressure to a temperature above the glass transition temperature of the polyoxadiazole.

8 Claims, No Drawings

BONDED STRUCTURES

The present invention relates to bonded structures comprising polyarylene-oxadiazoles, and to a process for the manufacture thereof.

The term "polyarylene-oxadiazoles" as used throughout this specification is meant to include polyarylene-1, 3, 4-oxadiazoles having the characteristic repeating unit.

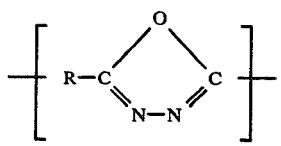

where R is an arylene radical. The oxadiazoles may be homopolymers derived from a single dibasic aryl acid, or copolymers derived from two or more different dibasic aryl acids.

Shaped articles of polyarylene-oxadiazoles have a wide angle X-ray diffraction pattern which, depending upon the degree of order of the polymer, may show a single equatorial reflection corresponding to a spacing of 3.4A or two reflections corresponding to spacings of 3.4A and 6.4A. It has now been found that only those articles of polyarylene-oxadiazole having a single equatorial reflection can be bonded to themselves or to other material under the influence of heat and pressure.

Therefore according to one aspect of the present invention, a process of forming a bonded structure comprises bonding a shaped article of polyarylene-oxadiazole to a contiguous shaped article under the influence of heat and pressure, the said shaped article of polyarylene-oxadiazole having an X-ray diffraction pattern which shows a single equatorial reflection. The shaped article contiguous with the polyarylene-oxadiazole shaped article may itself be formed from polyarylene-oxadiazole, or may be formed from another material.

According to a further aspect of the present invention, a bonded structure comprises a shaped article of polyarylene-oxadiazole thermally bonded to a contiguous shaped article.

Shaped articles for use in the present invention are those formed from polyarylene-oxadiazoles in which the arylene radical of the repeat unit has one or more aromatic rings. The aromatic rings may be of the fused type. An example of a polyarylene-oxadiazole containing fused rings is poly 2, 6-naphthylene-2, 5-(1, 3, 4-oxadiazole), made from 2,6-naphthylene dicarboxylic acid. Particularly suitable polyoxadiazoles are 1,4- and 1,3-phenylene-2, 5-(1, 3, 4-oxadiazoles) made from terephthalic acid or isophthalic acid, respectively, or copolymers made from various mixtures of terephthalic and isophthalic acids. Desirably at least some of the aromatic rings have bulky side groups, such as, for example, bromine or iodine. Bromine groups may conveniently be introduced into the polymer by reacting the polymer in solution with bromine.

The shaped articles may be in the form of particles, films, sheets, continuous filaments or staple fibres, fabrics made from such filaments or fibres, or a combination of these forms. The term "fabrics" includes woven, knitted and non woven fabrics. The shaped articles must be in a dry state before undergoing bonding. Thus, where the shaped articles of polyarylene-oxadiazole are formed by precipitating the polymer from a solution of sulphuric acid or oleum, as in wet spinning, the precipitated polymer must be given a drying treatment before commencement of the bonding stage.

Our U.S. patent application Ser. No. 610,843 filed Sept. 5, 1975, now U.S. Pat. No. 4,035,465, describes means for preparing various polyarylene-oxadiazoles, and their conversion into fibres and filaments. Fibres and filaments prepared according to the processes described in this application may be suitable for forming bonded structures according to the present invention.

Whether the X-ray diffraction pattern of a shaped article of polyarylene-oxadiazole has one or two equatorial reflections will depend upon factors such as the chemical structure of the polyarylene-oxadiazole and the treatment to which the article has been submitted prior to the bonding stage. Polyarylene-oxadiazoles formed from two or more dibasic aryl acids (i.e. copolymers) or polymers having bulky side groups, such as, for example, bromine or iodine groups, will tend to crystallise with difficulty. Articles formed from these polymers will generally show a single equatorial reflection unless they are given a treatment to induce crystallisation, such as, an annealing treatment by exposure to an elevated temperature. In the case where the article is in the form of a filament or fibre, drawing at a temperature above the glass transition temperature may result in the showing of two reflections depending upon the nature of the polymer from which the filament or fibre is formed.

The temperature of bonding can be varied over a wide range provided that it is equal to or above the glass transition temperature of the article formed from polyarylene-oxadiazole. Desirably bonding temperatures approaching or above the temperature at which the polyarylene-oxadiazole article or the shaped article formed from another material (if present) decomposes should not be used. The pressure applied to the articles may also vary over a wide range. Generally, the strength of the bond produced depends upon the bonding temperature and the pressure applied.

Where at least one of the shaped articles is in the form of a film, sheet, or fabric, bonding may occur over the entire surface of the article(s), for example, by bonding the articles between heated platens. Alternatively, bonding may occur at discrete points on the surface of the article, for example, by passing the articles through a pair of nip rolls, one of the rolls having heated projections which co-operate with a backing roll. The roll may, for example, have between 50 and 1,000 projections per square inch, the projections having tips with a cross-sectional area from $1 \times 10^{-5}$ square inches to $5 \times 10^{-4}$ square inches, and between 1 and 10% of the total area of the roll comprising the projection tips.

The invention will be further described with reference to the following examples. In these examples the following characteristics of fibres of polyarylene-oxadiazoles were determined by the methods described below.

Wide Angle X-ray Diffraction Pattern

A wide angle X-ray diffraction pattern of the fibre is made using a flat plate camera having the dimensions $8.5 \times 11.0$ cms. The collimator consists of 3 pinholes, the two end ones of 0.105 cm diameter and the intermediate one of 0.055 cm. A sample to film distance of 5 cm is used and the radiation is generated by a Philips X-ray unit type PW1009 fitted with a Philips copper target fine focus diffraction tube type PW1043/01 and a nickel beta-filter: the unit is operated at 40 kV and 15 mA.

Fibre samples are carefully wrapped on a former so that the individual filaments are essentially parallel to each other and a bundle of 0.15–0.20 cm diameter is obtained. The diffraction pattern is recorded on Ilford Industrial G X-ray film. The film is exposed for a sufficient time to obtain a pattern which is considered acceptable by conventional standards (e.g. a pattern in which the diffraction spot to be measured has a sufficient photographic density, usually between 0.2 and 1.0 in optical density). An exposure time of 30 minutes was suitable for spun fibres. For drawn samples the time was usually 15 minutes.

The orientation angles of fibres are determined from the X-ray film using a densitometer method. The Azimuthal intensity distribution of the diffraction arc is obtained using a Wooster Recording Microdensitometer Mk.II manufactured by Crystal Structures Ltd. and a Honeywell recorder type 153 × 18-VH.

A suitable photographic negative of a fibre diffraction pattern is placed upon the rotatable circular stage of the microdensitometer with centre spot of the diffraction pattern coincident with the centre of the stage; both these centres are then made coincidant with the focussed sample light beam of the instrument. A suitable calibrated optical density wedge is placed in the reference beam and the mounted film moved until the sample beam passes through the most intense point of the diffraction spot to be measured. Having thus located the maximum intensity, suitable fine adjustments are made and then the azimuthal intensity is recorded through 180° i.e. from minimum through maximum and back to minimum. The arc length between the points with intensity equal to half of the maximum intensity is taken as the orientation angle of the sample.

THERMAL STABILITY

Thermal stability of the fibre was assessed by thermal analysis, since the decomposition is an exothermic process. The experimental procedure was as follows: 8 – 10 mg of fibre was cut to size and encapsulated into a Perkin-Elmer sample pan. The sample was placed into a du Pont 900 DSC cell and heated under nitrogen at the rate 21° C/min to 490° C. Temperatures $T_D'$ and $T_D''$ at which the rate of heat evolution was $5 \times 10^{-2}$ cal g$^{-1}$ sec$^{-1}$ and $10 \times 10^{-2}$ cal g$^{-1}$ sec$^{-1}$ respectively, were determined from the thermogram. Temperature $T_D°$, which was taken as the measure of the thermal stability of the material was calculated from the equation $T_D° = 2T_D' - T_D''$.

GLASS TRANSITION TEMPERATURE

Glass transition temperature was determined using a Differential Scanning Calorimeter (Perkin - Elmer, model DSC-2). Nitrogen was used as an inert gas. Heating rate was 80° C/min. Onset of the step-wise change in the baseline was taken as the transition temperature. Corrections for the instrumental time lag and temperature scale nonlinearity were applied.

INHERENT VISCOSITY

Inherent viscosity is defined as $1n$ ($\eta$rel)/C, where C is concentration (viz. 0.5g of polymer per 100 ml of solution) and $\eta$rel is the ratio between the flow times of the polymer solution and solvent as measured at 25° C in a capillary viscometer. The solvent used was 98% sulphuric acid.

EXAMPLE 1

A mixture of terephthalic acid (166.2 parts), isophthalic acid (166.2 parts), hydrazine sulphate (273.3 parts) and 30% oleum (3300 parts) was heated with stirring at 130° – 135° C for 5 hours. The obtained viscous solution was cooled to 30° C and 51 parts of bromine were added. The temperature was raised to 100° C and the mixture was stirred for 3 hours. The resulting polymer contained 14.5% bromine by weight and had an inherent viscosity 2.78 dl/g.

The dope, at a temperature of 155° C, was dry jet wet spun through a spinneret, containing 10 orifices of 200 micron diameter, into water maintained at 26° C. The yarn was given a spin stretch factor of 1.0 and was collected at a wind-up speed of 15m/min. The yarn was then washed in water for 16 hours, and subsequently dried by passing it through a blanked of hot air, before being wound up at a speed of 3.4 m/min.

The spun yarn had a decitex of 550, a tenacity of 0.8 g/dtex, an extensibility of 170%, and an initial modulus of 24 g/dtex.

The X-ray diffraction pattern showed that the fibre is non-crystalline and poorly oriented. Only one equatorial reflection corresponding to spacing 3.4A was observed having a half-peak width of approximately 90°. Thermal stability $T_D$ was found to be 421° C, and the glass transition temperature was 342° C, i.e. 79° C below $T_D°$ C.

Fibre was also examined by Thermomechanical Analysis using a Perkin-Elmer, model TMS-1 analyser operated according to the manufacturer's handbook. Nitrogen was used as an inert gas, the heating rate was 10° C/min and the stress was 0.01 g/dtex. An extension of 10% was reached at 337° C, i.e. close to the transition temperature determined by differential scanning calorimetry.

Yarn was spread randomly on a thin aluminium sheet to give 6 mg yarn per cm$^2$. It was then compressed at 400° C using a pressure of 80 kg/cm$^2$ for 3 mins. A bonded web was obtained.

EXAMPLE 2

Example 1 was repeated with fresh yarn using a pressure of 20 kg/cm$^2$. A web with weaker bonds was obtained.

EXAMPLE 3

Example 1 was repeated except that a pressure of 120 kg/cm$^2$ was used. The resulting bonded web was fused to the aluminium sheet.

EXAMPLE 4

Spun dried yarn, prepared as in Example 1, was drawn between two sets of rolls with associated separator rolls while passing over and in contact with a grooved hot plate 46 cm in length. The plate temperature was set to 430° C, the draw ratio was 5, and the wind-up speed 100 m/min.

The obtained hot drawn yarn had an initial modulus of 90 g/dtex and its X-ray diffraction pattern showed only one equatorial reflection (corresponding to a spacing of 3.4A) with a half-peak width of 32°.

Yarns spread on a thin aluminium sheet were compressed at 400° C using a pressure of 80 kg/cm$^2$ for 5 mins. A bonded web was obtained.

EXAMPLE 5

Drawn yarn was prepared as in Example 4 using a wind-up speed of 150 m/min and a draw ratio 20. The drawn yarn had an initial modulus of 190 g/dtex, and showed only one equatorial reflection corresponding to a spacing of 3.4A.

A bonded web was obtained using the conditions described in Example 4.

EXAMPLE 6

A spinning dope was prepared under similar conditions to those described in Example 1 but using terephthalic acid/isophthalic acid in a ratio of 80/20. The resulting copolymer, containing 21% by weight of bromine and having an inherent viscosity of 3.1 dl/g, was spun at a temperature of 180° C by the method described in Example 1.

The resulting spun yarn had a decitex of 600, a tenacity of 0.85 g/dtex, and an extensibility of 184%.

The X-ray diffraction pattern of the yarn showed only one equatorial reflection corresponding to a spacing of 3.4A.

Thermal stability gave a $T_D°$ of 436° C and Thermomechanical Analysis, as described in Example 1, indicated an extension of 10% was reached at 319° C.

Yarn was spread on an aluminium sheet and a bonded web was obtained by applying a pressure of 100 kg/cm$^2$ for 6 mins at 415° C.

EXAMPLE 7

A copolymer having an inherent viscosity of 1.86 dl/g and a bromine content of 22% by weight was prepared by a method similar to that given in Example 1 except that terephthalic acid and isophthalic acid were used in a ratio of 90:10 by weight. The resulting polymer was spun as described in Example 1 to give a yarn which showed only one equatorial reflection, and a $T_D°$ of 457° C. Thermomechanical Analysis indicated an extension of 10% was reached at 315° C.

Yarn was randomly spread on an aluminium sheet and a pressure of 80 kg/cm$^2$ was applied for 5 minutes whilst the yarn and aluminium sheet were heated at a temperature of 400° C. A bonded web was obtained.

COMPARATIVE EXAMPLE A

Spun dried yarn, prepared according to Example 7 was hot drawn as described in Example 4 but using a hot plate set to 450° C and a draw ratio of 8.

The X-ray diffraction pattern of the drawn yarn showed two equatorial reflections corresponding to spacings of 3.4A and 6.4A, indicating that structural changes (i.e. crystallisation) had occurred during the drawing stage.

Randomly spread yarn was subjected to a pressure of 100 kg/cm$^2$ at 400° C for 5 mins. Virtually no bonding occured.

EXAMPLE 8

A brominated copolymer (terephthalic acid/isophthalic acid ratio 30/70, 10.7% wt of bromine, inherent viscosity 2.6 dl/g) was dry jet wet spun at a temperature of 160° C into a 10 filament yarn having a decitex of 540 and an initial modulus of 26 g/dtex. The yarn showed a single equatorial reflection.

The fibre was knitted into fabric which was pressed at 400° C at a pressure of 80 kg/cm$^2$ for 3 mins to give a regularly bonded material.

EXAMPLE 9

The regularly bonded material of Example 8 was placed between two polyester films (MELINEX). A composite material was obtained by compression at 280° C, using a pressure of 80 kg/cm$^2$, the fabric being firmly bonded to the films.

EXAMPLE 10

A film was cast on a glass plate using the polymer solution described in Example 1. Following washing and drying two layers of the 100 μ thick film were compressed for 3 minutes at 380° C under 80 kg/cm$^2$ pressure. The two layers were strongly laminated together following this treatment.

COMPARATIVE EXAMPLE B

A homopolymer was made by reacting terephthalic acid (332.4 parts) with hydrazine sulphate (273.3 parts) in 25% oleum (3,300 parts) for 4 hours at 130° C. Fibres spun from the polymer solution showed two equatorial reflections. A film cast from glass plates using the polymer solution had an inherent viscosity of 2.5 dl/g and was 80 μ thick. Two thicknesses of film could not be laminated under conditions of temperature and pressure up to 450° C and 160 kg/cm$^2$ respectively.

We claim:

1. A process for thermally bonding together contiguous shaped articles formed from a polyarylene oxadiazole having an X-ray diffraction pattern which shows a single equatorial reflection, the process comprising heating the said articles to a temperature above the glass transition temperature while under a pressure of at least 20 kg/cm$^2$.

2. A process according to claim 1 wherein the shaped articles are fibers.

3. A process according to claim 1 wherein the shaped articles are films.

4. A process according to claim 1 wherein at least some of the arylene radicals of the shaped polyarylene oxadiazole have substituents selected from the group consisting of bromine and iodine.

5. A process for thermally bonding a fibrous structure comprising forming a fibrous structure of fibers of polyphenylene—2,5—(1, 2, 4 - oxadiazole) in which at least some of the phenylene radicals have substituents selected from the group consisting of bromine and iodine, said fibers having an X-ray diffraction pattern which shows a single equatorial reflection corresponding to a spacing of 3.4 A, and subjecting the fibrous structure to a pressure of at least 20 kg/cm$^2$ and a temperature above the glass transition temperature of the fibers.

6. A bonded structure formed from shaped articles of a polyarylene oxadiazole having an X-ray diffraction pattern which shows a single equatorial reflection, by heating said shaped articles to a temperature above their glass transition temperature while under a pressure of at least 20 kg/cm$^2$.

7. A bonded structure according to claim 6 wherein at least some of the arylene radicals of the polyarylene oxadiazole have substituents selected from the group consisting of bromine and iodine.

8. A bonded structure according to claim 6 wherein the shaped articles are fibers.

* * * * *